United States Patent
Chan et al.

(10) Patent No.: US 12,321,446 B1
(45) Date of Patent: Jun. 3, 2025

(54) SYSTEM AND METHOD FOR DETECTING ADVERSARIAL ARTIFICIAL INTELLIGENCE ATTACKS

(71) Applicant: FLEXXON PTE. LTD., Singapore (SG)

(72) Inventors: Mei Ling Chan, Singapore (SG); Muthubalaji Ramkumar, Singapore (SG); Hong Chuan Tan, Singapore (SG)

(73) Assignee: FLEXXON PTE. LTD., Singapore (SG)

( * ) Notice: Subject to any disclaimer, the term of this patent is extended or adjusted under 35 U.S.C. 154(b) by 0 days.

(21) Appl. No.: 18/940,355

(22) Filed: Nov. 7, 2024

(51) Int. Cl.
*G06F 21/55* (2013.01)

(52) U.S. Cl.
CPC .................. *G06F 21/55* (2013.01)

(58) Field of Classification Search
None
See application file for complete search history.

(56) References Cited

U.S. PATENT DOCUMENTS

2021/0352087 A1* 11/2021 Ryver ................. H04L 63/1416
2023/0385675 A1* 11/2023 Jones ....................... G06N 3/092

FOREIGN PATENT DOCUMENTS

CN 116644321 A * 8/2023

OTHER PUBLICATIONS

Singapore Search Report completed Jul. 15, 2024 for Singapore Application No. 10202401602R filed Jun. 5, 2024, 2 pages.
Singapore Written Opinion completed Jul. 17, 2024 for Singapore Application No. 10202401602R filed Jun. 5, 2024, 6 pages.

\* cited by examiner

*Primary Examiner* — Nelson S. Giddins
(74) *Attorney, Agent, or Firm* — Cesari and McKenna, LLP; Steven M. Mills

(57) ABSTRACT

This document describes a system and method that utilizes principles of quantum mechanics to detect and mitigate adversarial artificial intelligence (AI) attacks on AI agents. The disclosed system first retrieves a baseline quantum state lattice matrix derived from ground truth inputs and ground truth outputs, where each output includes multiple inferred outcomes with probability amplitudes. Output quantum states are then generated from acquired data and quantum states are then generated for each row in the baseline matrix. A quantum-based anomaly classification is then performed based on this generated data to detect adversarial activity occurring at the AI agent.

18 Claims, 5 Drawing Sheets

SYSTEM AND METHOD FOR DETECTING ADVERSARIAL ARTIFICIAL INTELLIGENCE ATTACKS

CROSS-REFERENCE TO RELATED APPLICATIONS

The present application claims priority to Singapore patent application Ser. No. 10202401602R, filed on Jun. 5, 2024, the entire contents of which are hereby incorporated by reference.

TECHNICAL FIELD

This application relates to a system and method that utilizes principles of quantum mechanics to detect and mitigate adversarial artificial intelligence (AI) attacks on AI agents.

BACKGROUND

Artificial intelligence (AI) agents are autonomous computer modules that are designed to perform tasks or make decisions based on their environment and objectives. These AI agents usually comprise trained machine learning models that enable the AI agent to interpret and analyze data, learn from experiences, and adapt to changing conditions. Through various means, such as sensors or data inputs, AI agents can sense or perceive their surroundings and subsequently use this information to reason/infer, make decisions, and execute actions.

The development and deployment of AI agents have the potential to revolutionize industries and improve efficiency, accuracy, and decision-making in various domains. As such, AI agents play a crucial role in various fields, including healthcare, finance, transportation, and scientific research. They are central to the development of intelligent systems and applications, such as virtual assistants, autonomous vehicles, recommendation systems, and chatbots. As AI technology continues to advance, AI agents are becoming increasingly sophisticated, enabling them to tackle more complex tasks and operate in dynamic and uncertain environments.

Thus far, the rapid advancement of AI technology has primarily been centered around enhancing its ability to execute increasingly sophisticated tasks. However, there has been a relative lack of emphasis on security measures, rendering many AI platforms and AI agents vulnerable to the mishandling of sensitive information. This vulnerability stems from the fact that machine learning (ML) models are susceptible to synthetically crafted inputs that can deceive AI technology, a phenomenon known as adversarial AI attacks which in turn then renders the AI agent ineffective. In such attacks, malicious third parties will craft and input specially designed data, known as adversarial examples, to deceive and manipulate the AI model. These adversarial examples are often indistinguishable from legitimate data to human observers but are engineered to cause the AI model to make incorrect predictions or classifications thereby exploiting vulnerabilities in the AI model's design, such as its sensitivity to small perturbations in the input data. This vulnerability stems from adversarial crafted inputs that affect the prediction function of trained ML models. Attackers engineer these inputs to cause incorrect outputs, whereby these inputs are virtually indistinguishable from legitimate data. Specifically, ML models are sensitive to minor calibrated perturbations in the inputs they are trying to classify or predict. By adding small but carefully chosen distortions, attackers exploit this sensitivity to manipulate model conclusions.

It should be noted that adversarial attacks do not necessarily only tamper with or alter the original training data. Instead, such attacks may also involve the surgical implantation of outliers in the otherwise unmodified input data that is fed into the trained model for inference. Such attacks tend to fool the model by shifting classification boundaries during runtime prediction, thereby inducing inaccurate outputs.

Adversarial AI attacks also pose grave threats to decision critical industries such as healthcare, finance, infrastructure security, communications, and more. For example, attacks could tamper with MRI cancer detection, sabotage algorithmic trading platforms, corrupt smart grid controls, or manipulate natural language recommendation engines. Such attacks can be broadly categorized based on their objectives, techniques, and the stage of the AI model's lifecycle they target. One category of adversarial AI attacks is evasion attacks. In such attacks, attackers aim to deceive the AI model during inference by crafting input data that leads to incorrect predictions or classifications. For example, adding imperceptible noise to an image to fool a facial recognition system into misidentifying a person. Another category would include exploratory attacks. Under such attacks, attackers will probe the AI model to gain insights into its behavior or structure. Another type of attack is the model inversion attack which aims to reconstruct sensitive information from the model's outputs. As for model extraction type of attacks, attackers attempt to replicate the target model by observing its inputs and outputs and as for backdoor attacks, attacker will implant a hidden backdoor in the model during training and this backdoor can then be activated by a specific trigger input to produce a malicious output.

In the context of security considerations, it is observed that potential attacks may occur on the end-user system where a configured, trained version of the model resides as compared to the training stage of the ML model. The vulnerability often emerges in the prediction phase, where outliers are injected, leading to the ML model's operational disruption. In certain scenarios, end users may not have direct access to the original training data that shaped the ML model unless a compromise occurred during the software development phase. However, another conceivable scenario involves self-learning ML models that continuously update and retrain. Even in this case, anomalies in prediction output would serve as the entry point, rather than direct access to the input training data.

Hence, despite the efforts of those skilled in the art, it's still a challenge to address security concerns within ML models and/or AI systems as these ML models are unable to detect such adversarial attacks. These challenges stem from the inherently elusive nature of such attacks, which can manifest through nuanced alterations to the original data, eluding detection by conventional means. As a result, such attacks may not have been previously categorized or classified by existing solutions and therefore would not be detectable.

SUMMARY

In one aspect of the present disclosure, a defender module for detecting adversarial Artificial Intelligence (AI) attacks at a trained AI agent that is communicatively coupled to the defender module is disclosed. It is disclosed that the defender module comprises a processing unit and a non-transitory media readable by the processing unit, the media storing instructions that when executed by the processing unit causes the processing unit to acquire and store input data provided to the trained AI agent together with output data generated by the trained AI agent based on the input data provided to the trained AI agent, and to retrieve a baseline quantum state lattice matrix that was generated based on ground truth inputs provided to the trained AI agent and ground truth outputs generated by the trained AI agent for each of the ground truth inputs provided to the trained AI agent, and wherein each of the generated ground truth outputs comprises a plurality of outcomes inferred by the trained AI agent and probability amplitudes associated with each of the plurality of outcomes. The instructions then direct the processing unit to generate an output quantum state based on the acquired output data; generate a quantum state for each row in the baseline quantum state lattice matrix; and perform a quantum-based anomaly classification of the acquired data based on the generated output quantum state, and the quantum states generated for each row in the baseline quantum state lattice matrix.

In a further embodiment of this aspect, the generation of the baseline quantum state lattice matrix comprises instructions for directing the processing unit to: record the plurality of outcomes inferred by the trained AI agent as basis states of the baseline quantum state lattice matrix; and record the probability amplitudes associated with each of the plurality of outcomes as elements of the baseline quantum state lattice matrix, wherein each row of the matrix is associated with a ground truth input.

In a further embodiment of this aspect, the instructions that causes the processing unit to perform a quantum-based anomaly classification of the captured output data comprises instructions for directing the processing unit to: identify from the output quantum state a basis state that has a highest probability amplitude; perform a quantum amplitude amplification on the identified basis state based on the output quantum state; perform, for each row in the baseline quantum state lattice matrix, a quantum amplitude amplification on a basis state that is similar to the identified basis state based on the quantum state generated for the row; flag quantum amplified basis states of each of the rows of the baseline quantum state lattice matrix that exhibit a degree of similarity to the quantum amplified identified basis state; and determine that the acquired input data comprises an AI adversarial attack when the ground truth inputs associated with each of the flagged quantum amplified basis states exhibits a degree of dissimilarity with the acquired input data.

In another aspect of the present disclosure, a method for detecting adversarial Artificial Intelligence (AI) attacks at a trained AI agent using a defender module that is communicatively coupled to the AI target is disclosed. The disclosed method comprises the steps of acquiring and storing input data provided to the trained AI agent together with output data generated by the trained AI agent based on the input data provided to the trained AI agent and retrieving a baseline quantum state lattice matrix that was generated based on ground truth inputs provided to the trained AI agent and ground truth outputs generated by the trained AI agent for each of the ground truth inputs provided to the trained AI agent, wherein each of the generated ground truth outputs comprises a plurality of outcomes inferred by the trained AI agent and probability amplitudes associated with each of the plurality of outcomes. The method then comprises the steps of generating an output quantum state based on the acquired output data, generating a quantum state for each row in the baseline quantum state lattice matrix, and performing a quantum-based anomaly classification of the acquired data based on the generated output quantum state, and the quantum states generated for each row in the baseline quantum state lattice matrix.

In accordance with a further embodiment of this aspect, the generation of the baseline quantum state lattice matrix comprises the steps of recording the plurality of outcomes inferred by the trained AI agent as basis states of the baseline quantum state lattice matrix; and recording the probability amplitudes associated with each of the plurality of outcomes as elements of the baseline quantum state lattice matrix, wherein each row of the matrix is associated with a ground truth input.

In accordance with a further embodiment of this aspect, the step of performing a quantum-based anomaly classification of the captured output data comprises the steps of identifying from the output quantum state a basis state that has a highest probability amplitude; performing a quantum amplitude amplification on the identified basis state based on the output quantum state; performing, for each row in the baseline quantum state lattice matrix, a quantum amplitude amplification on a basis state that is similar to the identified basis state based on the quantum state generated for the row; flagging quantum amplified basis states of each of the rows of the baseline quantum state lattice matrix that exhibit a degree of similarity to the quantum amplified identified basis state; and determining that the acquired input data comprises an AI adversarial attack when the ground truth inputs associated with each of the flagged quantum amplified basis states exhibits a degree of dissimilarity with the acquired input data.

BRIEF DESCRIPTION OF THE DRAWINGS

Various embodiments of the present disclosure are described below with reference to the following drawings.

DETAILED DESCRIPTION

Figure 1:
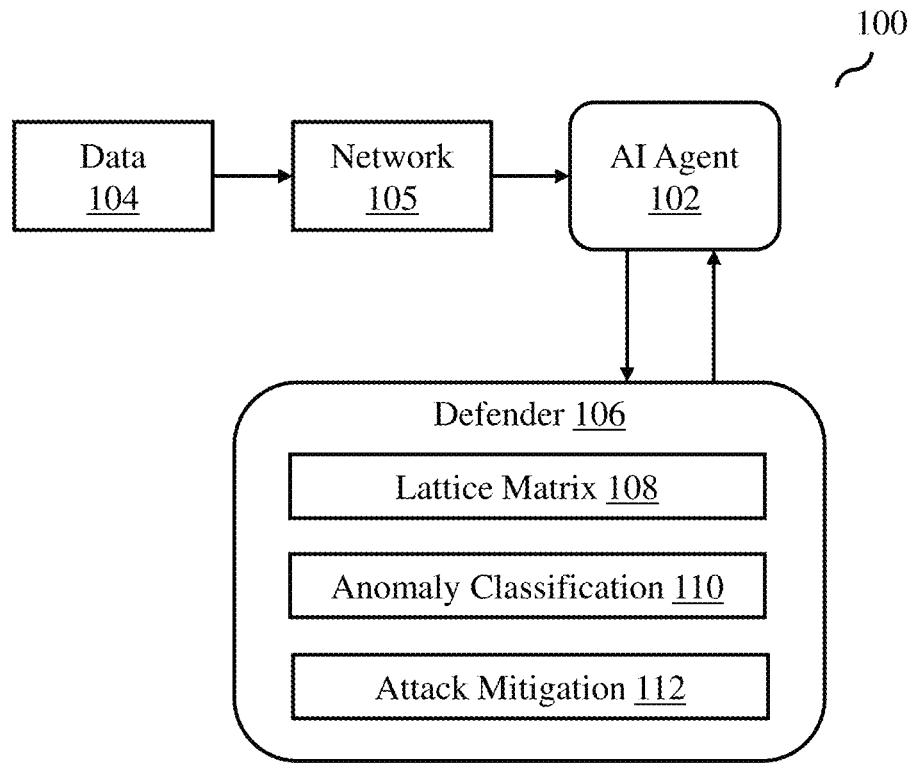
FIG. 1 illustrates a block diagram representative of system for detecting adversarial AI attacks at an AI agent in accordance with embodiments of the present disclosure.

The following detailed description is made with reference to the accompanying drawings, showing details and embodiments of the present disclosure for the purposes of illustration. Features that are described in the context of an embodiment may correspondingly be applicable to the same or similar features in the other embodiments, even if not explicitly described in these other embodiments. Additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance as generally understood in the relevant technical field, e.g., within 10% of the specified value.

As used herein, the term "and/or" includes any and all combinations of one or more of the associated listed items.

As used herein, "comprising" means including, but not limited to, whatever follows the word "comprising". Thus, use of the term "comprising" indicates that the listed elements are required or mandatory, but that other elements are optional and may or may not be present.

As used herein, "consisting of" means including, and limited to, whatever follows the phrase "consisting of". Thus, use of the phrase "consisting of" indicates that the listed elements are required or mandatory, and that no other elements may be present.

As used herein, the terms "first," "second," and the like in the description, in the claims, and in the figures are used for distinguishing between similar objects and not necessarily for describing a particular sequential or chronological order.

As used herein, the term "AI agent" and the like in the description refers to a computer module designed to perform tasks, perform inferences, or make decisions autonomously based on its environment and objectives. The computer module would usually comprise a trained machine learning model that has been configured and adjusted using a set of training data to recognize patterns, make decisions, or predict outcomes. The trained machine learning model can then be used by the AI agent to make inferences or predictions on new, unseen data.

As used herein, the term "quantum state lattice matrix" and the like in the description refers to a multi-dimensional array, where each value in the matrix may comprise a complex number that encodes both the magnitude and phase of the probability amplitude for each state of a qubit. Specifically, the entries in the matrix represent the probability amplitudes of the system being in various combinations of basis states.

As used herein, the term "quantum basis state" and the like in the description refers to a subset of a primary state whereby upon decomposition of a basis state, i.e., expressing the states in a more complex state, it will yield all potential superimposed states of a system that has undergone quantization. The determination of a basis state typically involves various methodologies-all aimed at capturing a subset of states which can then be subsequently subjected to a decomposition process which will reveal all feasible superimposed states comprising of the basis states that are applicable to a specific quantum system. In other words, a basis state is a basis vector that represents one of the possible states in which a quantum system can be found. For example, a basis state for a single qubit system may be represented as $|0\rangle$ or $|1\rangle$ or in a two-qubit system as $|00\rangle$, $|01\rangle$, $|10\rangle$, and $|11\rangle$, where each basis state represents all possible combinations of the states in the systems. It should be noted that each basis state corresponds to a distinct configuration of the qubits, and any quantum state of the system can be expressed as a superposition (linear combination) of these basis states with complex coefficients called probability amplitudes.

Further, one skilled in the art will recognize that certain functional units in this description have been labelled as modules, sub-modules or sets of processing elements throughout the specification. The person skilled in the art will also recognize that a module, a sub-module or a set of processing elements may be implemented as circuits, logic chips or any sort of discrete component. Still further, one skilled in the art will also recognize that a module, a sub-module or a set of processing elements may be implemented in software which may then be executed by a variety of processor architectures. In embodiments of the disclosure, a module, a sub-module or a set of processing elements may also comprise computer instructions, computations or executable code that may instruct a computer processor to carry out a sequence of events based on instructions received. The choice of the implementation of the modules, the sub-modules or the sets of processing elements is left as a design choice to a person skilled in the art and does not limit the scope of the claimed subject matter in any way.

Quantum computing seeks to harness the principles of quantum mechanics for computational purposes. Unlike classical computers, which use bits that can only be in one of two states denoted as 0 and 1 at any given time, quantum computers utilize qubits. These qubits can be in any superposition of these two states, allowing quantum computers to process multiple computational paths simultaneously.

Unlike a classical bit, a qubit may exist not only in these two discrete states but in all possible linear superpositions of these states. In mathematical terms, the state of a qubit may be represented by a state vector in a two-dimensional Hilbert space. Using the Dirac notation, the state vector of a qubit ψ may be written as:

$$|\psi\rangle = \alpha|0\rangle + \beta|1\rangle \qquad \text{equation (1)}$$

where α and β are complex numbers and $|\alpha|^2+|\beta|^2=1$. When the qubit ψ is measured, there is the probability of $|\alpha|^2$ that $|0\rangle$ will be returned and there is the probability of $|\beta|^2$ that $|1\rangle$ will be returned. It should be noted that quantum measurements are non-deterministic, and the act of measurement changes the quantum state irreversibly. In other words, before the qubit is measured, the qubit will exist in a quantum superposition of the states $|0\rangle$ and $|1\rangle$. Once measured, the outcome will not be in a quantum state but instead will be in a classical state. Hence, the measured outcome will be either $|0\rangle$ or $|1\rangle$ but not a superposition of the two states. This occurs as during the measurement of the qubit, the quantum state will collapse to the classical state it gets observed in, and all subsequent measurements deterministically result in this same outcome with a probability equal to 1.

In embodiments of the disclosure, quantum computing processes and/or steps described herein may be implemented using the Qiskit software development kit (SDK) developed by IBM. The Qiskit SDK is a comprehensive software development kit for quantum computing that empowers users to experiment with quantum algorithms, circuits, and applications. Built on the Python programming language, Qiskit provides a user-friendly interface for creating, manipulating, and simulating quantum circuits, as well as for interfacing with real quantum hardware. The SDK comprises a rich set of tools, libraries, and resources that facilitate every stage of quantum programming, from designing quantum circuits to executing them on actual quantum processors.

While quantum computing hardware is still in its infancy and not widely accessible, the Qiskit SDK primarily operates on traditional computing systems such as laptops, desktops, servers, and cloud-based platforms. It includes powerful simulators that allow users to simulate the behavior of quantum circuits and algorithms on classical computers, enabling them to test and debug quantum programs without access to quantum hardware. Moreover, Qiskit provides visualization tools and libraries that run seamlessly on traditional computing devices, allowing users to visualize and analyze quantum circuits, state vectors, and measurement results.

In embodiments of the disclosure, a defender module may be deployed at an AI agent to enhance the security and resilience of the AI system against adversarial AI attacks. The main function of such a module would be to detect, mitigate, and prevent malicious activities targeting the AI agent. It operates by continuously monitoring the inputs and outputs of the AI agent, analyzing patterns and behaviors for signs of adversarial manipulation, and applying appropriate countermeasures to safeguard the integrity of the system. By integrating a defender module, the AI agent is better equipped to maintain its performance and reliability in the face of evolving cybersecurity threats, ensuring that it remains a trustworthy and effective tool in its respective applications.

FIG. 1 illustrates a system for detecting adversarial AI attacks at an AI agent in accordance with embodiments of the present disclosure. System 100 comprises AI agent 102 and defender module 106 that is deployed at AI agent 102, where defender module 106 is configured to monitor data provided to, and data generated by AI agent 102. In embodiments of the disclosure, AI agent 102 may be configured to receive data 104 through network 105.

In embodiments of the disclosure, data 104 may comprise sensor data obtained from various sensors such as temperature readings, motion detections, or changes in light intensity; data obtained from user interactions such as user commands, questions, or responses provided through voice or text input; data obtained from market sources such as prices, trading volumes, or economic indicators; data obtained from network traffic such as logs of network traffic, access attempts, or detected anomalies; data obtained from health metrices such as a patient's vital signs, medical test results, or changes in health status; or data obtained from environmental metrices such as data on weather conditions, soil moisture levels, or crop growth; or data obtained from social media feeds such as posts, comments, likes, or shares. One skilled in the art will recognize that data 104 is not limited to the examples provided above and may include all sorts of data that may be used by trained machine learning models to perform the required predictions, classifications and/or inferences.

As for network 105, this network may include one or more computer communication networks such as the Internet, a wired network such as a local area network (LAN) or a wide area network (WAN), a wireless network such as a wireless LAN (WLAN) or mobile networks, or any other similar networks. A network adapter card or a network interface module may also be provided in each computing/processing device in system 100 to facilitate communication between the respective modules and/or components.

In embodiments of the disclosure, defender module 106 may comprise lattice matrix sub-module 108 that is configured to generate and store quantum state lattice matrices, to record and classify basis states associated with output probabilities for outcomes predicted, classified and/or inferred by AI agent 102, and to record and store the probability amplitudes for outcomes predicted, classified and/or inferred by AI agent 102. Defender module 106 also has anomaly classification sub-module 110 that is configured to perform an anomaly classification of events occurring at AI agent 102 and attack mitigation sub-module 112 that is configured to carry out mitigation strategies to protect AI agent 102 from the detected adversarial AI attack.

In operation, defender module 106 will be deployed at AI agent 102 where module 106 may be communicatively coupled to the input and/or output ports of AI agent 102 such that any data provided to AI agent 102 via network 105 and/or generated by AI agent 102 will be received by defender module 106.

During an initialization or setup phase, defender module 106 will commence its interaction with AI agent 102. It should be noted at this stage that AI agent 102 comprises a machine learning model that has been trained to perform a specific type and/or a variety of classification, prediction and/or inference tasks and is in a state where it may be deployed for its intended functions. For example, AI agent 102 may comprise a machine learning model that has been trained to identify and classify items in a digital image based on features in the digital image. In other words, the trained machine learning model may utilize features of the digital image such as the colors in each pixel and the arrangement of the pixels relative to neighboring pixels to calculate a probability that the item contained the digital image may be classified as a particular item, e.g., a chair.

During this initialization phase, AI agent 102 is deployed in a 'safe' operating environment whereby the inputs provided to AI agent 102 are from trusted sources, i.e., comprise ground truth inputs. This is to ensure that the outputs generated by AI agent 102 during this initialization phase comprise ground truth outputs corresponding to each of the inputs provided to AI agent 102 and are not the result of compromised data and/or adversarial attacks. As AI agent 102 is performing its classification, prediction and/or inference processes, lattice matrix sub-module 108 is configured to record and store in a database, the inputs provided to AI agent 102, the outcomes produced by AI agent 102 together with the probability amplitudes associated with each of the produced outcomes as generated by AI agent 102. In embodiments of the disclosure, this initialization phase may comprise a predefined period of time, e.g., all the output data generated over a period of a week, or a month may be recorded or may comprise a predetermined set of input data. Typically, this phase is usually conducted for a length of time or for a sufficiently large input set of data to ensure that all possible outputs produced by the AI agent may be captured by lattice matrix sub-module 108. The exact duration of the initialization phase is left as a design choice for one skilled in the art.

As an example, continuing on from the previous example described above, based on the digital image received by AI agent 102, AI agent 102 may determine during this initialization phase that there is a 0.6 probability that an outcome is that the image contains firearms, a 0.2 probability that another outcome is that the image contains bladed weapons, a 0.15 probability that yet another outcome is that the image contains physical assault items and 0.05 probability that still yet another outcome is that the image does not contain any items. Lattice matrix sub-module 108 will then store the features of the digital image (as the input data) together with the corresponding outcomes produced by AI agent 102 and probabilities associated with each of the outcomes in a database.

Figure 2:
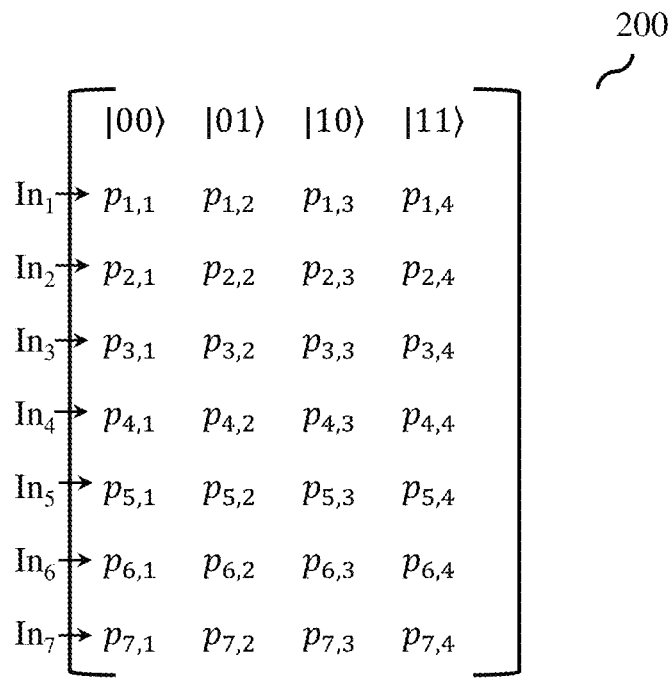
FIG. 2 illustrates an exemplary two-dimensional quantum state lattice matrix in accordance with embodiments of the present disclosure.

Once the initialization phase has ended, lattice matrix sub-module 108 may then proceed to generate a quantum state lattice matrix based on the information stored in the database. In embodiments of the disclosure, each column of the matrix may be defined to represent a basis state whereby each basis state in the matrix may represent an outcome inferred by AI agent 102. Further, for each row in the matrix, each element in this row may represent a probability of a corresponding outcome occurring when a particular input is provided to AI agent 102. An example of such a quantum state lattice matrix is illustrated in FIG. 2. Matrix 200 was generated based on the assumption that AI agent 102 produced four (4) possible outcomes for seven (7) sets of input data, i.e., $In_1$ to $In_7$. Each of the four possible outcomes are represented by a basis state, i.e., one of $|00\rangle$ to $|11\rangle$, and each basis state is used as the unique heading of each column. Further, each of the cells in matrix 200, e.g., $p_{1,1}$ to $p_{7,4}$, represents a probability of a corresponding outcome occurring. For example, $p_{4,3}$ represents a probability that an outcome associated with $|10\rangle$ will occur when an input $In_4$ is provided to AI target 102.

In the example shown in FIG. 2, as four basis states were required, a two-qubit system was employed. It should be noted that as the number of basis states increases, the number of qubits employed will increase according to the relationship defined by: for a system of n qubits, there will be $2^n$ basis states. For example, if 16 basis states are required, a 4-qubit system will then be employed.

Figure 3:
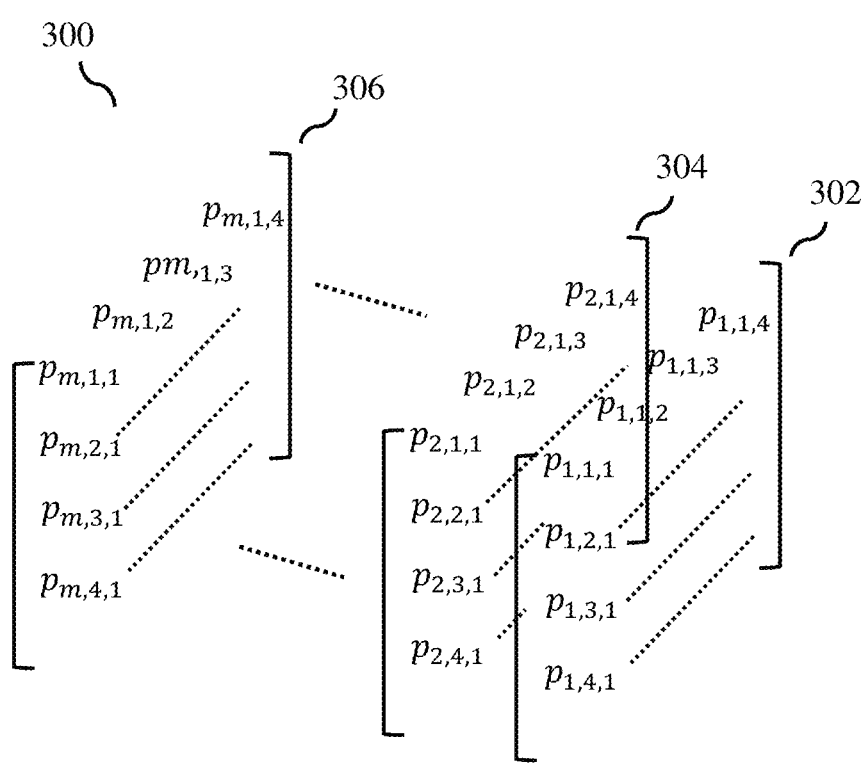
FIG. 3 illustrates an exemplary three-dimensional quantum state lattice matrix in accordance with embodiments of the present disclosure.

In embodiments of the disclosure, lattice matrix sub-module 108 may be configured to generate a three-dimensional (3D) quantum state lattice matrix whereby each layer represents a quantum state lattice matrix for a particular time period. Such a three-dimensional quantum state lattice matrix is illustrated in FIG. 3 whereby each layer in matrix 300 represents a quantum state lattice matrix for a particular time period. In this embodiment, layer 302 or matrix 302 represents a quantum state lattice matrix for a first time period whereby all the input data, i.e., the rows of the matrix, and the probability of corresponding outcomes produced by AI target 102 during this first time period are plotted in matrix 302, layer 304 represents a quantum state lattice matrix for a second time period whereby all the input data, i.e., the rows of the matrix, and the probability of corresponding outcomes produced by AI target 102 during this second time period are plotted in layer 304 and layer 306 represents a quantum state lattice matrix for a m-th time period whereby all the input data, i.e., the rows of the matrix, and the probability of corresponding outcomes produced by AI target 102 for this m-th time period are plotted in matrix 306. The exact number of layers in the three-dimensional quantum state lattice matrix is left as a design choice for one skilled in the art. Further, each time period may comprise one day, one week, one month or any other predetermined period as required.

In further embodiments of the disclosure, instead of waiting for the initialization phase to end, lattice matrix sub-module 108 may generate and populate the cells in a quantum state lattice matrix during the initialization phase-concurrently as the data is received. In other words, as lattice matrix sub-module 108 receives the input data, and records and stores the outcomes produced by AI agent 102 (based on the input data) together with the probability amplitudes associated with each of the produced outcomes, sub-module 108 may simultaneously populate the cells in the quantum state lattice matrix during this step with this information as it is being received by sub-module 108.

Once lattice matrix sub-module 108 has completed the generation of the two-dimensional or three-dimensional quantum state lattice matrix, the generated matrix may then be used by defender module 106 as the baseline matrix to monitor the performance of AI target 102 for anomalous behaviors.

With reference to FIG. 1, in normal operation, when new data is provided to AI agent 102, AI agent 102 will proceed to generate a set of possible outcomes based on the received data. The data provided to AI agent 102 and the outcome generated by AI agent 102 will then be captured by defender module 106. Anomaly classification sub-module 110 will then compare the captured information with the information in the previously generated baseline matrix to determine if AI agent 102 has been compromised by adversarial AI attacks. It is useful to note that all the possible outcomes generated by AI agent 102 at this step will be similar with the basis states that were defined in the previously generated baseline matrix.

In embodiments of the disclosure, each of the results produced by AI agent 102 may comprise of multiple outcomes, where each outcome is associated with a specific probability indicating the likelihood of that outcome occurring. Anomaly classification sub-module 110 then proceeds to generate a quantum state $|\psi_{out}\rangle$ (which is a superposition of the plurality of outcomes) based on the basis states associated with each of the outcomes (as defined during the generation of the baseline matrix) and their corresponding probabilities of occurrence. Once this is done, anomaly classification sub-module 110 then generates, for each row in the baseline matrix, quantum states of all the basis states and their corresponding probabilities of occurrence. It is useful to note that a combination of a probability amplitude and its corresponding basis states may be defined as a term or a component of the quantum state—where each term of a quantum state represents a product of a probability amplitude and its corresponding basis state.

In a first embodiment of the disclosure, the anomaly classification sub-module 110 will analyze the quantum state $|\psi_{out}\rangle$ associated with the results produced by AI agent 102, to pinpoint the basis state in this quantum state that has the highest corresponding probability amplitude. Following this identification, it scans the quantum states associated with the baseline matrix to flag a basis state that is similar to that of the identified state.

Terms of the quantum states that are associated with this flagged basis state, along with the term of quantum state $|\psi_{out}\rangle$ that is associated with the initially identified state, are then subjected to quantum amplitude amplification—a process that significantly enhances the amplitudes of these selected terms of the quantum states, making them more prominent within the quantum state spectrum. In other words, quantum amplitude amplification is performed on the terms of these quantum states in order to make the amplitude of these terms of these quantum states more distinguishable and when compared to the overall noise level. It should be noted that an amplified quantum state is defined as a quantum state in which the probability amplitude associated with a basis state of the quantum state has been intentionally increased through the quantum amplitude amplification process. To simplify, when reference is made to a quantum amplified $1^{st}$ basis state, it is understood that the probability amplitude of the $1^{st}$ basis state has been amplified through the process of quantum amplitude amplification, resulting in the creation of the corresponding amplified quantum state.

Continuing from the amplification, sub-module 110 compares the quantum amplified flagged basis states as obtained from the baseline matrix to the quantum amplified identified state of quantum state $|\psi_{out}\rangle$, to identify quantum amplified flagged basis states that are the closest match to the quantum amplified identified state of quantum state $|\psi_{out}\rangle$, i.e., to identify quantum amplified flagged basis states of each of the rows of the baseline quantum state lattice matrix that exhibit a degree of similarity to the quantum amplified identified basis state. In embodiments of the disclosure, the degree of similarity may be determined as a measure of fidelity between the amplified basis states being compared—where a fidelity close to '1' (e.g., greater than 0.95) may be considered to exhibit a sufficient degree of similarity. It is useful to note that the Fidelity, F for two quantum states $|\psi\rangle$ and $|\phi\rangle$ may be defined as $F=(|\psi\rangle, |\phi\rangle)=|\langle\psi|\phi\rangle|^2$. The corresponding rows of these quantum amplified flagged basis states from the baseline matrix are then further flagged for additional analysis.

During the analysis stage, sub-module 110 retrieves input data associated with these identified rows and compares it against the new data provided to AI agent 102. In other words, at this step, sub-module 110 determines whether the acquired input data associated with these identified rows comprises an AI adversarial attack when these input data exhibit a degree of dissimilarity with the the new data provided to AI agent 102. The degree of dissimilarity between datasets can be assessed through a variety of statistical and computational methods. For straightforward comparisons between the input data associated with each of the flagged rows and the new data, Euclidean distances may be used to quantify dissimilarities in spatial or multivariate data. Additionally, correlation measures like Pearson or Spearman's rank offer insights into linear or monotonic relationships, respectively. Techniques such as cosine similarity and Jaccard index are particularly useful in text and set comparison, while Hamming distance applies to comparing equal-length data strings. For more complex or structured data, visual tools like dendrograms or machine learning models including clustering and dimensionality reduction techniques may be used to reveal underlying patterns and groupings, highlighting dissimilarities not immediately apparent through direct statistical methods. The choice of the method to be adopted is dependent on the type of machine learning model that is adopted by AI agent 102 and as such, is left as a design choice to one skilled in the art.

In summary, this comparison aims to detect significant discrepancies between the historical and new data, which would suggest a potential compromise of AI agent 102. Should such a discrepancy be found, sub-module 110 triggers the attack mitigation sub-module 112, initiating the necessary procedures to mitigate the threat, thereby ensuring the integrity and security of AI agent 102.

In a further embodiment of the disclosure, the anomaly classification sub-module 110 may analyze the quantum state $|\psi_{out}\rangle$ associated with the results produced by AI agent 102, to identify a few basis states in this quantum state $|\psi_{out}\rangle$ that has the highest probability amplitudes. Following this identification, it scans the quantum states associated with the baseline matrix to flag basis states that are similar as that of the identified states.

Terms of the quantum states that are associated with the flagged basis states, along with terms of quantum state $|\psi_{out}\rangle$ that are associated with the initially identified states, then each subjected to a multi-target quantum amplitude amplification process to make the amplitudes of the terms of the quantum states mentioned above more distinguishable and/or when compared to the overall noise level. Continuing from the amplification, sub-module 110 compares the quantum amplified flagged basis states as obtained from the baseline matrix to the quantum amplified identified states as obtained from quantum state $|\psi_{out}\rangle$, to identify quantum amplified flagged basis states from the baseline matrix that are the closest match to the quantum amplified identified states as found in quantum state $|\psi_{out}\rangle$. The corresponding rows of these quantum amplified states from the baseline matrix are then flagged for further analysis as mentioned in the previous embodiment.

The description of the first embodiment is best explained using the following simplified example. When new data $I_{new}$ is provided to AI agent 102, it is assumed that AI agent 102 produces four possible outcomes, i.e., $Out_1$ to $Out_4$. Each of these outcomes and their probability of occurrence are associated with their corresponding basis state in the baseline matrix and this may be represented as: $Out_1$ being associated with $|00\rangle$ and a probability of $p_a$, $Out_2$ being associated with $|01\rangle$ and a probability of $p_b$, $Out_3$ being associated with $|10\rangle$ and a probability of $p_c$, and $Out_4$ being associated with $|11\rangle$ and a probability of $p_d$.

A quantum state $|\psi_{out}\rangle$ that represents a superposition of these four basis states that are associated with outcomes, i.e., $Out_1$ to $Out_4$ is then generated as:

$$|\psi_{out}\rangle = p_a|00\rangle + p_b|01\rangle + p_c|10\rangle + p_d|11\rangle$$

The detailed steps for the generation of the quantum state are omitted for brevity in this description as it is known to one skilled in the art.

Anomaly classification sub-module 110 then proceeds to generate, for each row in the baseline matrix, a superposition of all the basis states and their corresponding probability of occurrence. Under the assumption that matrix 200 is used as the baseline matrix, this implies that for each row in matrix 200 (as shown in FIG. 2), a quantum state that represents a superposition of all the probability of occurrences of the basis states in that row will be generated. As a result, seven quantum states (as matrix 200 comprises 7 rows) will be generated for a baseline matrix based on matrix 200. The seven quantum states in this example may be defined as:

$$|\psi_{In1}\rangle = p_{1,1}|00\rangle + p_{1,2}|01\rangle + p_{1,3}|10\rangle + p_{1,4}|11\rangle$$

$$|\psi_{In2}\rangle = p_{2,1}|00\rangle + p_{2,2}|01\rangle + p_{2,3}|10\rangle + p_{2,4}|11\rangle$$

$$|\psi_{In3}\rangle = p_{3,1}|00\rangle + p_{3,2}|01\rangle + p_{3,3}|10\rangle + p_{3,4}|11\rangle$$

$$|\psi_{In4}\rangle = p_{4,1}|00\rangle + p_{4,2}|01\rangle + p_{4,3}|10\rangle + p_{4,4}|11\rangle$$

$$|\psi_{In5}\rangle = p_{5,1}|00\rangle + p_{5,2}|01\rangle + p_{5,3}|10\rangle + p_{5,4}|11\rangle$$

$$|\psi_{In6}\rangle = p_{6,1}|00\rangle + p_{6,2}|01\rangle + p_{6,3}|10\rangle + p_{6,4}|11\rangle$$

$$|\psi_{In7}\rangle = p_{7,1}|00\rangle + p_{7,2}|01\rangle + p_{7,3}|10\rangle + p_{7,4}|11\rangle$$

Sub-module 110 then analyzes the quantum state $|\psi_{out}\rangle$, to identify the basis state with the highest probability amplitude, which in this example is assumed to be $p_b$, which corresponds to basis state $|01\rangle$. Following this identification, it scans the seven quantum states listed above to identify the similar basis state, i.e., basis state $|01\rangle$, from these quantum states and to subsequently flag the identified basis state.

Terms of the quantum states that are associated with this flagged basis state, i.e., basis state $|01\rangle$, along with the term of quantum state $|\psi_{out}\rangle$ that is associated with the initially identified state, are then subjected to quantum amplitude amplification. The quantum amplified flagged basis states are then compared to the quantum amplified identified state of quantum state $|\psi_{out}\rangle$, to identify quantum amplified flagged basis states that are the closest match to the quantum amplified identified state of quantum state $|\psi_{out}\rangle$.

Under the assumption that the quantum amplified states $p_{5,2}|01\rangle$, $p_{6,2}|01\rangle$, $p_{7,2}|01\rangle$ and $p_{2,2}|01\rangle$ were found to be the closest match (e.g., having a delta of <0.05) to the quantum amplified state $p_p|01\rangle$, the input data corresponding to these amplified quantum states of $p_{5,2}|01\rangle$, $p_{6,2}|01\rangle$, $p_{7,2}|01\rangle$ and $p_{2,2}|01\rangle$ are then retrieved and compared against the new data $I_{new}$ to determine if there are any significant discrepancies between the historical input data and the new data. Should such a discrepancy be found, sub-module 110 triggers the attack mitigation sub-module 112, initiating the necessary procedures to mitigate the threat, thereby ensuring the integrity and security of AI agent 102.

In a second embodiment of the disclosure, defender module 106 may utilize a three-dimensional (3D) baseline matrix having two or more layers in place of the two-dimensional baseline matrix. Each layer in this 3D baseline matrix represents a different time frame thereby allowing a more dynamic and historical perspective of the system to be obtained over time.

Similar to that of the first embodiment, the anomaly classification sub-module 110 will then proceed to analyze the quantum state $|\psi_{out}\rangle$ associated with the results produced by AI agent 102, to pinpoint the basis state in this quantum state that has the highest probability amplitude. Following this identification, it scans the quantum states associated with the various layers in the 3D baseline matrix to flag basis states that resemble the identified state. This step of scanning the quantum states associated with the layers of the 3D baseline matrix effectively compares the latest results produced by AI agent 102 with historical and current data patterns as represented by the 3D baseline matrix.

Terms of the quantum states that are associated with this flagged basis state, along with the term of quantum state $|\psi_{out}\rangle$ that is associated with the initially identified state, are then subjected to quantum amplitude amplification. Sub-module 110 then compares the quantum amplified flagged basis states as obtained from the 3D baseline matrix to the quantum amplified identified state of quantum state $|\psi_{out}\rangle$, to identify quantum amplified flagged basis states that are the closest match to the quantum amplified identified state of quantum state $|\psi_{out}\rangle$, The corresponding rows of these amplified quantum states from the various layers of the 3D baseline matrix are then flagged for further analysis. During the analysis stage, sub-module 110 retrieves input data associated with these flagged rows and compares it against the new data provided to AI agent 102. Should significant discrepancies between the historical and new data be found, sub-module 110 then triggers the attack mitigation sub-module 112, initiating the necessary procedures to mitigate the threat, thereby ensuring the integrity and security of AI agent 102. In further embodiments, sub-module 110 may be configured to only trigger the attack mitigation sub-module 112 when it is determined that the discrepancies between the new input data and the historical input data occurs across a significant number of layers of the 3D baseline matrix By extending the baseline matrix to include multiple layers representing different time frames, defender module 106 gains a more robust capability to monitor, detect, and react to anomalies based on both current and historical data patterns. This approach enhances the predictive power and security robustness of defender module 106 by leveraging temporal dynamics as provided for by the 3D baseline matrix.

Figure 4:
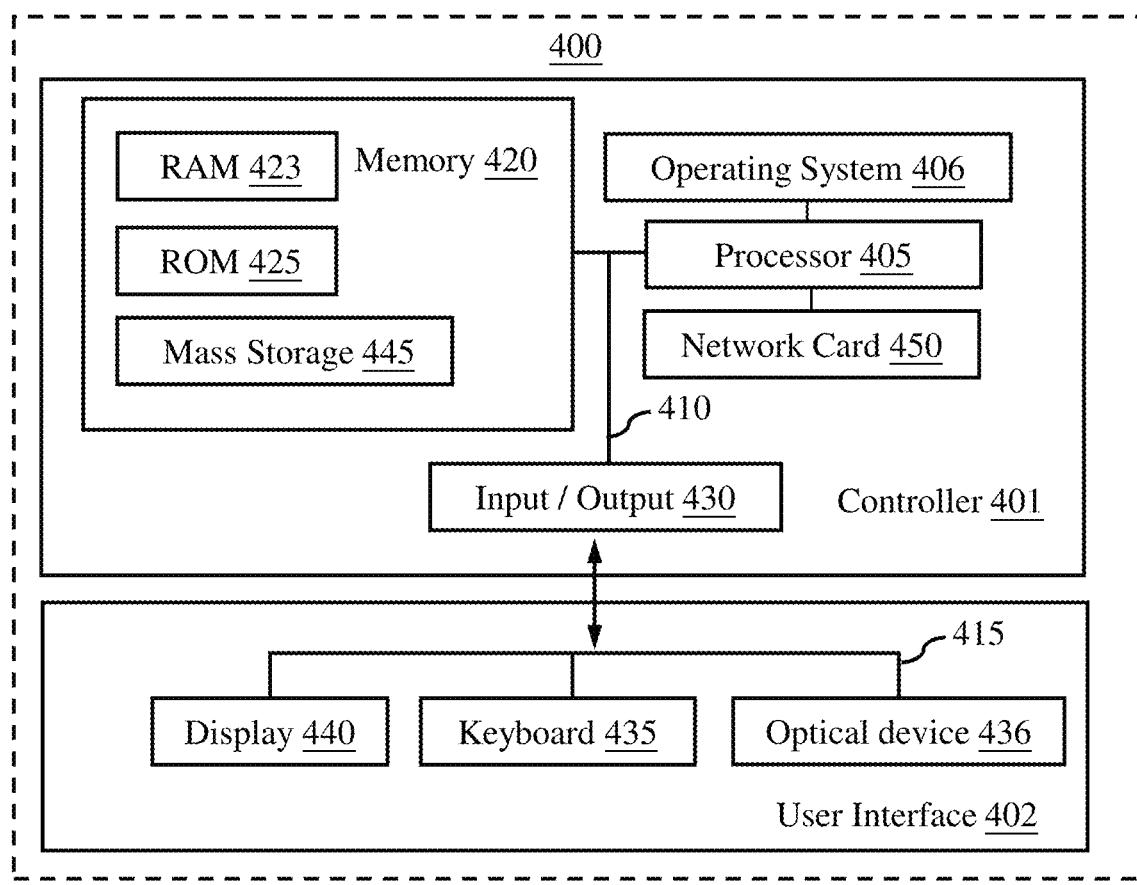
FIG. 4 illustrates a block diagram representative of a processing system for performing embodiments of the present disclosure.

In accordance with embodiments of the present disclosure, a block diagram representative of components of processing system 400 that may be provided within defender module 106 and the various sub-modules contained therein to carry out the digital signal processing functions or computations in accordance with embodiments of the disclosure, or any other modules or sub-modules of the system is illustrated in FIG. 4. One skilled in the art will recognize that the exact configuration of each processing system provided within these modules or sub-modules may be different and the exact configuration of processing system 400 may vary and the arrangement illustrated in FIG. 4 is provided by way of example only.

In embodiments of the disclosure, processing system 400 may comprise controller 401 and user interface 402. User interface 402 is arranged to enable manual interactions between a user and the computing module as required and for this purpose includes the input/output components required for the user to enter instructions to provide updates to each of these modules. A person skilled in the art will recognize that components of user interface 402 may vary from embodiment to embodiment but will typically include one or more of display 440, keyboard 435 and optical device 436.

Controller 401 is in data communication with user interface 402 via bus 415 and includes memory 420, processing unit, processing element or processor 405 mounted on a circuit board that processes instructions and data for performing the method of this embodiment, an operating system 406, an input/output (I/O) interface 430 for communicating with user interface 402 and a communications interface, in this embodiment in the form of a network card 450. Network card 450 may, for example, be utilized to send data from these modules via a wired or wireless network to other processing devices or to receive data via the wired or wireless network. Wireless networks that may be utilized by network card 450 include, but are not limited to, Wireless-Fidelity (Wi-Fi), Bluetooth, Near Field Communication (NFC), cellular networks, satellite networks, telecommunication networks, Wide Area Networks (WAN) and etc.

Memory 420 and operating system 406 are in data communication with processor 405 via bus 410. The memory components include both volatile and non-volatile memory and more than one of each type of memory, including Random Access Memory (RAM) 423, Read Only Memory (ROM) 425 and a mass storage device 445, the last comprising one or more solid-state drives (SSDs). One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 420 may include a kernel and/or programming modules such as a software application that may be stored in either volatile or non-volatile memory.

Herein the term "processor" is used to refer generically to any device or component that can process such instructions and may include: a microprocessor, a processing unit, a plurality of processing elements, a microcontroller, a programmable logic device or any other type of computational device. That is, processor 405 may be provided by any suitable logic circuitry for receiving inputs, processing them in accordance with instructions stored in memory and generating outputs (for example to the memory components or on display 440). In this embodiment, processor 405 may be a single core or multi-core processor with memory addressable space. In one example, processor 405 may be multi-core, comprising—for example—an 8 core CPU. In another example, it could be a cluster of CPU cores operating in parallel to accelerate computations.

Figure 5:
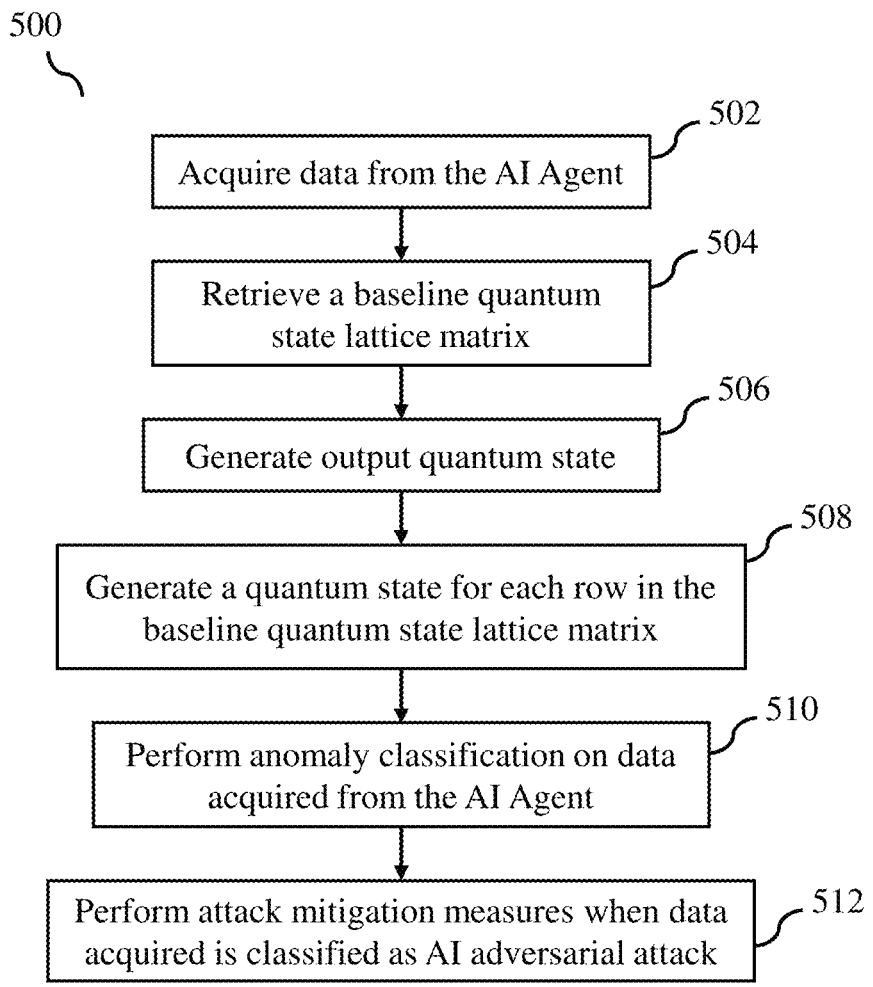
FIG. 5 illustrates a flowchart showing a process for detecting adversarial Artificial Intelligence (AI) attacks at a trained AI agent using a defender module that is communicatively coupled to the defender module in accordance with embodiments of the disclosure.

A process for detecting adversarial AI attacks at a trained AI agent is illustrated in FIG. 5 whereby process 500 may be carried out by a defender module that is communicatively coupled to the AI agent in accordance with embodiments of the disclosure.

Process 500 begins at step 502 by acquiring and storing input data provided to the trained AI agent. At the same time, process 500 will also acquire and store output data generated by the trained AI agent whereby the output data is generated based on the input data provided to the trained AI agent. Once this is done, process 500 then proceeds to step 504 where process 500 retrieves a previously generated quantum state lattice matrix from a database and/or memory contained within the defender module. In embodiments of the disclosure, this database may be provided on a remote server or cloud server and may be provided to the defender module through wireless or wired communication means. Process 400 then generates an output quantum state based on the acquired output data at step 506.

At step 508, process 500 then generates a quantum state for each row in the baseline quantum state lattice matrix. Process 500 then performs a quantum-based anomaly classification of the acquired data based on the generated output quantum state, and the quantum states generated for each row in the baseline quantum state lattice matrix. This takes place at step 510.

In other embodiments of the disclosure, process 500 may proceed to step 512 when process 500 determines at step 510 that the acquired input data is classified as an AI adversarial attack. At step 512, process 500 will perform attack mitigation measures to address and/or to stave off the AI adversarial attack on the trained AI agent.

Figure 6:
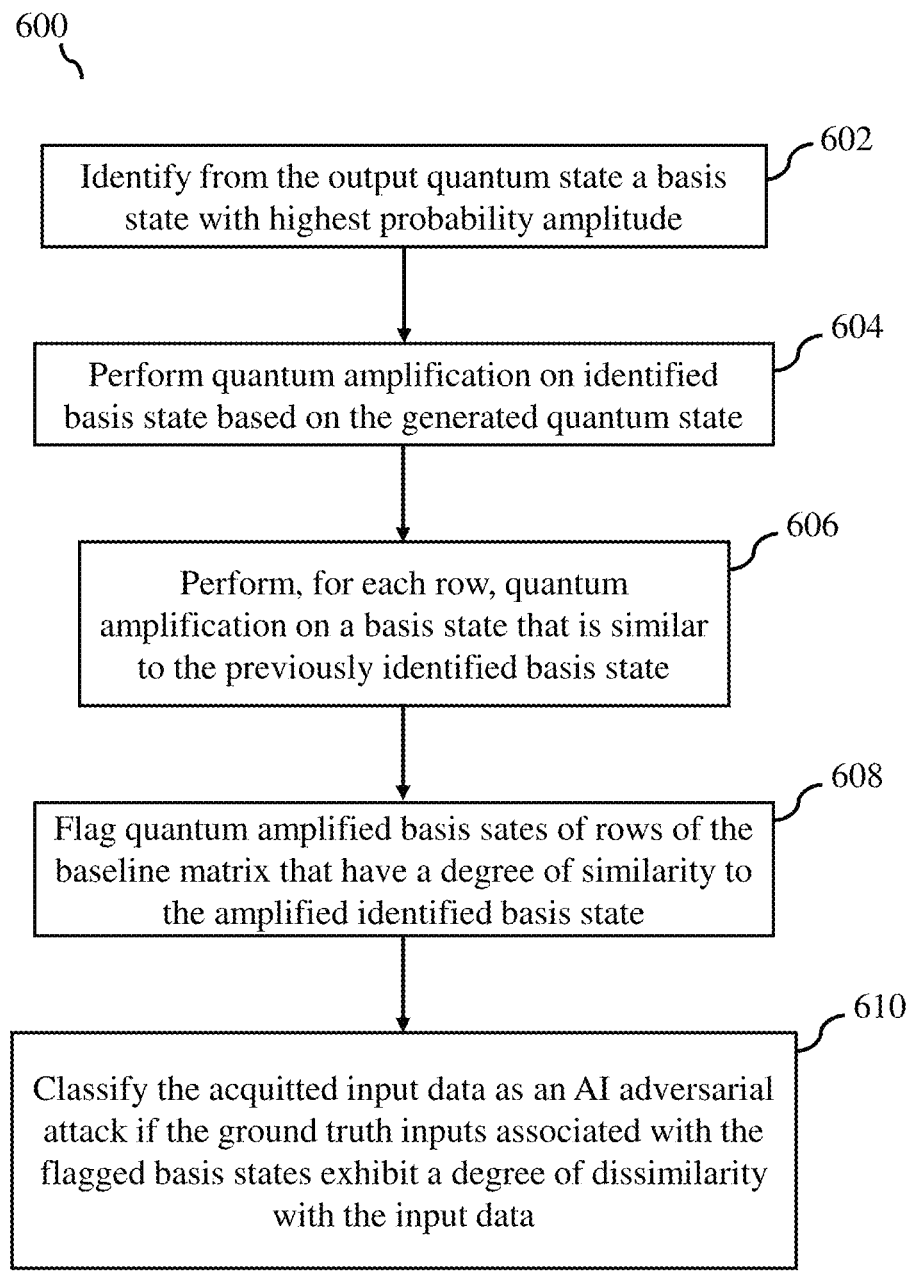
FIG. 6 illustrates a flowchart showing a process for performing anomaly classification of captured output data in accordance with embodiments of the disclosure.

A process for performing anomaly classifications of the captured output data is illustrated in FIG. 6 whereby process 600 may be carried out by the defender module in accordance with embodiments of the disclosure.

Process 600 begins at step 602 by identifying from the output quantum state a basis state that has the highest probability amplitude. Process 600 then proceeds to step 604 where process 600 then performs a quantum amplitude amplification on the identified basis state based on the output quantum state. At step 606, process 600 performs a quantum amplitude amplification on a basis state that is similar to the identified basis state based on the quantum state generated for each row in the baseline quantum state lattice matrix. Process 600 then flags quantum amplified basis states of each of the rows of the baseline quantum state lattice matrix that exhibit a degree of similarity to the quantum amplified identified basis state at step 608. At step 610, process 600 then classifies the acquired input data as an AI adversarial attack when the ground truth inputs associated with each of the flagged quantum amplified basis states exhibits a degree of dissimilarity with the acquired input data.

In accordance with another embodiment of the present disclosure, the baseline quantum state lattice matrix may be generated by a process that records the plurality of outcomes inferred by the trained AI agent as basis states of the baseline quantum state lattice matrix; and records probability amplitudes associated with each of the plurality of outcomes as elements of the baseline quantum state lattice matrix, wherein each row of the matrix is associated with a ground truth input.

In another embodiment of the present disclosure, a process for performing anomaly classifications of the captured output data may comprise the steps of generating an output quantum state based on the acquired output data and identify from the output quantum state a plurality of basis states that have probability amplitudes above a predetermined threshold, performing a multi-target quantum amplitude amplification on the identified plurality of basis states based on the output quantum state, generating, for each row in the baseline quantum state lattice matrix, a quantum state based on the basis states of the baseline quantum state lattice matrix and probability amplitudes associated with each of these basis states for the row, performing, for each row in the baseline quantum state lattice matrix, a multi-target quantum amplitude amplification on basis states that are similar to the identified plurality of basis states based on the quantum state generated for the row, flagging quantum amplified basis states of each of the rows of the baseline quantum state lattice matrix that exhibit a degree of similarity to the quantum amplified identified plurality of basis states, and determining that the acquired input data comprises an AI adversarial attack when the ground truth inputs associated with each of the flagged quantum amplified basis states exhibits a degree of dissimilarity with the acquired input data.

Numerous other changes, substitutions, variations, and modifications may be ascertained by the skilled in the art and it is intended that the present application encompass all such changes, substitutions, variations, and modifications as falling within the scope of the appended claims.

The invention claimed is:

1. A defender module for detecting adversarial Artificial Intelligence (AI) attacks at a trained AI agent that is communicatively coupled to the defender module, the defender module comprising:
   a processing unit; and
   a non-transitory media readable by the processing unit, the media storing instructions that when executed by the processing unit causes the processing unit to:
   acquire and store input data provided to the trained AI agent together with output data generated by the trained AI agent based on the input data provided to the trained AI agent;
   retrieve a baseline quantum state lattice matrix that was generated based on ground truth inputs provided to the trained AI agent and ground truth outputs generated by the trained AI agent for each of the ground truth inputs provided to the trained AI agent, and wherein each of the generated ground truth outputs comprises a plurality of outcomes inferred by the trained AI agent and probability amplitudes associated with each of the plurality of outcomes;
   generate an output quantum state based on the acquired output data, wherein the acquired output data comprises a plurality of outcomes inferred by the trained AI agent for the acquired input data and probability amplitudes associated with each of the plurality of outcomes;
   generate a quantum state for each row in the baseline quantum state lattice matrix; and
   perform a quantum-based anomaly classification of the acquired data based on the generated output quantum state, and the quantum states generated for each row in the baseline quantum state lattice matrix.

2. The defender module according to claim 1 whereby the generation of the baseline quantum state lattice matrix comprises instructions for directing the processing unit to:
record the plurality of outcomes inferred by the trained AI agent as basis states of the baseline quantum state lattice matrix; and
record the probability amplitudes associated with each of the plurality of outcomes as elements of the baseline quantum state lattice matrix, wherein each row of the matrix is associated with a ground truth input.

3. The defender module according to claim 1 whereby the instructions that causes the processing unit to perform a quantum-based anomaly classification of the captured output data comprises instructions for directing the processing unit to:
identify from the output quantum state a basis state that has a highest probability amplitude;
perform a quantum amplitude amplification on the identified basis state based on the output quantum state;
perform, for each row in the baseline quantum state lattice matrix, a quantum amplitude amplification on a basis state that is similar to the identified basis state based on the quantum state generated for the row;
flag quantum amplified basis states of each of the rows of the baseline quantum state lattice matrix that exhibit a degree of similarity to the quantum amplified identified basis state; and
determine that the acquired input data comprises an AI adversarial attack when the ground truth inputs associated with each of the flagged quantum amplified basis states exhibits a degree of dissimilarity with the acquired input data.

4. The defender module according to claim 1 whereby the instructions that causes the processing unit to perform a quantum-based anomaly classification of the captured output data comprises instructions for directing the processing unit to:
identify from the output quantum state a plurality of basis states that have probability amplitudes above a predetermined threshold;
perform a multi-target quantum amplitude amplification on the identified plurality of basis states based on the output quantum state;
perform, for each row in the baseline quantum state lattice matrix, a multi-target quantum amplitude amplification on basis states that are similar to the identified plurality of basis states based on the quantum state generated for the row;
flag quantum amplified basis states of each of the rows of the baseline quantum state lattice matrix that exhibit a degree of similarity to the quantum amplified identified plurality of basis states; and
determine that the acquired input data comprises an AI adversarial attack when the ground truth inputs associated with each of the flagged quantum amplified basis states exhibits a degree of dissimilarity with the acquired input data.

5. The defender module according to claim 1 whereby the baseline quantum state lattice matrix comprises a two-dimensional matrix.

6. The defender module according to claim 1 whereby the baseline quantum state lattice matrix comprises a three-dimensional (3D) matrix, wherein each layer of the 3D matrix represents a unique timeframe.

7. The defender module according to claim 2 wherein each probability amplitude represents a likelihood that an outcome occurs when a ground truth input is provided to the AI agent.

8. The defender module according to claim 1 further comprising instructions for directing the processing unit to:
perform attack mitigation measures when the acquired input data is classified as an AI adversarial attack.

9. The defender module according to claim 1 whereby the baseline quantum state lattice matrix was generated over a predetermined period of time.

10. A method for detecting adversarial Artificial Intelligence (AI) attacks at a trained AI agent using a defender module that is communicatively coupled to the AI target, the method comprising:
acquiring and storing input data provided to the trained AI agent together with output data generated by the trained AI agent based on the input data provided to the trained AI agent;
retrieving a baseline quantum state lattice matrix that was generated based on ground truth inputs provided to the trained AI agent and ground truth outputs generated by the trained AI agent for each of the ground truth inputs provided to the trained AI agent, wherein each of the generated ground truth outputs comprises a plurality of outcomes inferred by the trained AI agent and probability amplitudes associated with each of the plurality of outcomes;
generating an output quantum state based on the acquired output data, wherein the acquired output data comprises a plurality of outcomes inferred by the trained AI agent for the acquired input data and probability amplitudes associated with each of the plurality of outcomes;
generating a quantum state for each row in the baseline quantum state lattice matrix; and
performing a quantum-based anomaly classification of the acquired data based on the generated output quantum state, and the quantum states generated for each row in the baseline quantum state lattice matrix.

11. The method according to claim 10 whereby the generation of the baseline quantum state lattice matrix comprises the steps of:
recording the plurality of outcomes inferred by the trained AI agent as basis states of the baseline quantum state lattice matrix; and
recording the probability amplitudes associated with each of the plurality of outcomes as elements of the baseline quantum state lattice matrix, wherein each row of the matrix is associated with a ground truth input.

12. The method according to claim 10 whereby the step of performing a quantum-based anomaly classification of the captured output data comprises the steps of:
identifying from the output quantum state a basis state that has a highest probability amplitude;
performing a quantum amplitude amplification on the identified basis state based on the output quantum state;
performing, for each row in the baseline quantum state lattice matrix, a quantum amplitude amplification on a basis state that is similar to the identified basis state based on the quantum state generated for the row;
flagging quantum amplified basis states of each of the rows of the baseline quantum state lattice matrix that exhibit a degree of similarity to the quantum amplified identified basis state; and
determining that the acquired input data comprises an AI adversarial attack when the ground truth inputs associated with each of the flagged quantum amplified basis states exhibits a degree of dissimilarity with the acquired input data.

13. The method according to claim 10 whereby the step of performing a quantum-based anomaly classification of the captured output data comprises the steps of:
- identifying from the output quantum state a plurality of basis states that have probability amplitudes above a predetermined threshold;
- performing a multi-target quantum amplitude amplification on the identified plurality of basis states based on the output quantum state;
- performing, for each row in the baseline quantum state lattice matrix, a multi-target quantum amplitude amplification on basis states that are similar to the identified plurality of basis states based on the quantum state generated for the row;
- flagging quantum amplified basis states of each of the rows of the baseline quantum state lattice matrix that exhibit a degree of similarity to the quantum amplified identified plurality of basis states; and
- determining that the acquired input data comprises an AI adversarial attack when the ground truth inputs associated with each of the flagged quantum amplified basis states exhibits a degree of dissimilarity with the acquired input data.

14. The method according to claim 10 whereby the baseline quantum state lattice matrix comprises a two-dimensional matrix.

15. The method according to claim 10 whereby the baseline quantum state lattice matrix comprises a three-dimensional (3D) matrix, wherein each layer of the 3D matrix represents a unique timeframe.

16. The method according to claim 11 wherein each probability amplitude represents a likelihood that an outcome occurs when a ground truth input is provided to the AI agent.

17. The method according to claim 10 further comprising the step of:
- performing attack mitigation measures when the acquired input data is classified as an AI adversarial attack.

18. The method according to claim 10 whereby the baseline quantum state lattice matrix was generated over a predetermined period of time.

* * * * *